United States Patent [19]
Umiastowski et al.

[11] Patent Number: 5,828,069
[45] Date of Patent: Oct. 27, 1998

[54] IRRADIATION AND/OR COUNTING ENCLOSURE FOR NEUTRON DETECTION ANALYSIS

[75] Inventors: Krzysztof Umiastowski, Meudon; Frédéric Laine, Maurepas; Abdallah Lyoussi, Aix en Provence, all of France

[73] Assignee: Commissariat a l'Energie Atomique, Paris, France

[21] Appl. No.: 817,453
[22] PCT Filed: Oct. 18, 1995
[86] PCT No.: PCT/FR95/01373
  § 371 Date: Apr. 15, 1997
  § 102(e) Date: Apr. 15, 1997
[87] PCT Pub. No.: WO96/12974
  PCT Pub. Date: May 2, 1996

[30] Foreign Application Priority Data

Oct. 19, 1994 [FR] France .................................. 94 12468

[51] Int. Cl.⁶ ........................................................ G01T 3/00
[52] U.S. Cl. ......................................... 250/390.01; 250/394
[58] Field of Search .......................... 250/390.01, 496.1, 250/394, 506.1, 518.1

[56] References Cited

U.S. PATENT DOCUMENTS 5,278,417  1/1994  Sun .

FOREIGN PATENT DOCUMENTS

| 0042099 | 6/1981 | European Pat. Off. . |
| 0511109 | 4/1992 | European Pat. Off. . |
| 58-211682 | 12/1983 | Japan . |
| 1-140051 | 6/1989 | Japan ................................ 250/390.01 |
| 1-244345 | 9/1989 | Japan ................................ 250/390.01 |
| 2-222886 | 9/1990 | Japan ................................ 250/390.01 |

OTHER PUBLICATIONS

"Low Level Transuranic Waste Assay by Photon Interrogation and Neutron Counting" Lyoussi et al. Institute of Nuclear Material and Management (INMM), 34th Annual Meeting, Jul. 18–21, 1993, Scottsdale, Arizona.

"Determination of Alpha Activity and Fisstle Mass Content in Solid Waste by Systems Using Neutron Interrrogation" Dherbey et al Commissariat a L'Energie Atomique; Departmetn de Recherche Physique 1983; pp. 97–106.

*Primary Examiner*—Edward J. Glick
*Assistant Examiner*—Darren M. Jiron
*Attorney, Agent, or Firm*—Hayes, Soloway, Hennessey, Grossman, & Hage, P.C.

[57] ABSTRACT

A counting enclosure (24) for neutron detection has an outer wall and an inner space for receiving an object (26) to be tested, the wall being constituted by a first, inner cadmium coating (32), an inner moderator coating (38), an intermediate cadmium coating (34), an outer moderator coating (40) and an outer cadmium coating (36).

8 Claims, 3 Drawing Sheets

IRRADIATION AND/OR COUNTING ENCLOSURE FOR NEUTRON DETECTION ANALYSIS

DESCRIPTION

1. TECHNICAL FIELD

The present invention relates to the field of dosing α emitters in solid waste, with an aim of non-destructively knowing the quantities of certain elements (e.g. actinides) contained in this type of waste. It more specifically relates to an enclosure for the irradiation of waste and counting of neutrons emitted following irradiation of said waste. It has a direct application in installations using active or passive, neutron and/or photon dosing methods. In particular, the dosing of α emitters in solid waste makes it possible to classify them, account for the stored α activity or carry out a fissile material balance. This analysis is a vital stage in any radioactive waste management or control program.

2. PRIOR ART

With a view to non-destructively knowing the actinide quantity contained in a waste, several measuring methods have been studied, including the photon interrogation method by bremsstrahlung photon bias. Thus, a bremsstrahlung photon beam generally emanating from a pulse electron linear accelerator is used. These energetic photons induce photofission reactions on the heavy nuclei present in the waste. The measurement is based on the detection of prompt and/or delayed photofission neutrons. This method makes it possible to determine the quantities of fissile and fertile elements contained in the waste to be dosed or assayed. It is described in the article by A. LYOUSSI et al entitled "Low level transuranic waste assay by photon interrogation and neutron counting", Institute of Nuclear Material and Management (INMN), 34th Annual Meeting, Jul. 18–21, 1993, Scottsdale, Ariz.

In more general terms, it is possible to use two measuring methods, namely low energy irradiation and counting the prompt photofission neutrons and high energy irradiation followed by counting of the delayed photofission neutrons.

The first method has the advantage of good statistics. However, the reactions (γ, n) for the production of photoneutrons on different elements, apart from the transuranic elements, produce a parasitic signal rising with the energy of the photons. This gives rise to the need to work at relatively low gamma energies. This has the effect of reducing the number of useful reactions, the effective photofission cross-section being a rising function of the incident photon energy. This limits the counting of the prompt signal, whose intensity decreases in a few hundred microseconds.

The second method is in principle insensitive to instantaneous parasitic photoneutrons. Thus, it is based on the counting of delayed neutrons.

Initial investigations with the second method revealed a neutron component persisting for a long time after the photon pulse. Thus, the neutrons or rather the photoneutrons formed within the conversion target are diffused by air molecules and then rebound on the concrete walls and the materials of the surrounding structure. The typical dimensions of a room in which such a measurement is performed are generally adequate to ensure that these neutrons undergo an effect identical to that of a ping pong ball on a ping pong table and consequently their life is non-negligible, being approximately 5 milliseconds. Thus, the useful delayed signal is drowned in this parasitic photoneutron signal.

A first apparatus has been proposed making it possible to improve the performance characteristics of the method. This apparatus is described in the aforementioned publication. In brief and as illustrated in FIG. 1, it has a target 2 placed on the path of an electron beam 3. The electron-target collision makes it possible to produce bremsstrahlung. The waste 4 is contained in an enclosure, whose walls 6, 8, 10, 12 are e.g. made from polyethylene, located between two cadmium coatings 14, 16. The wall also contains $^3$He detectors for counting the neutrons.

It is possible to identify the influence of the cadmium by carrying out a recording, as a function of time, of the neutrons (γ, n) by a counting unit with and without cadmium. These results are illustrated in FIG. 2 by curves I (counting rate without cadmium) and II (counting rate with cadmium) and it would appear that the protection of the counting units by cadmium leads to an approximately factor 30 background noise reduction.

The parasitic neutron environment is predominantly of a thermal nature. However, this type of apparatus is used in large geometry accelerator halls and consequently the thermalization of the photoneutrons takes a very long time. Consequently at the useful signal counting times, there remains an epicadmic neutron environment (thermalized photoneutrons with an energy above 0.417 eV) for which the cadmium protection remains ineffective.

DESCRIPTION OF THE INVENTION

The present invention aims at solving this problem.

It more specifically relates to a counting and optionally irradiation enclosure for the detection of neutrons, said enclosure having an outer wall and an inner space for receiving an object to be tested, e.g. a waste container, a window for the passage of an e.g. photon excitation radiation beam, being optionally provided in the wall, said wall being constituted by a first, inner cadmium coating, an inner moderator coating, an intermediate cadmium coating, an outer moderator coating and an outer cadmium coating.

Thus, said enclosure has protections constituted on the one hand by several neutron moderator coatings and on the other by a shield constituted by several cadmium coatings.

BRIEF DESCRIPTION OF THE DRAWINGS

The features and advantages of the invention can be better gathered from the following description of non-limitative embodiments and with reference to the attached drawings, wherein show.

DETAILED DESCRIPTION OF EMBODIMENTS

Figure 3:
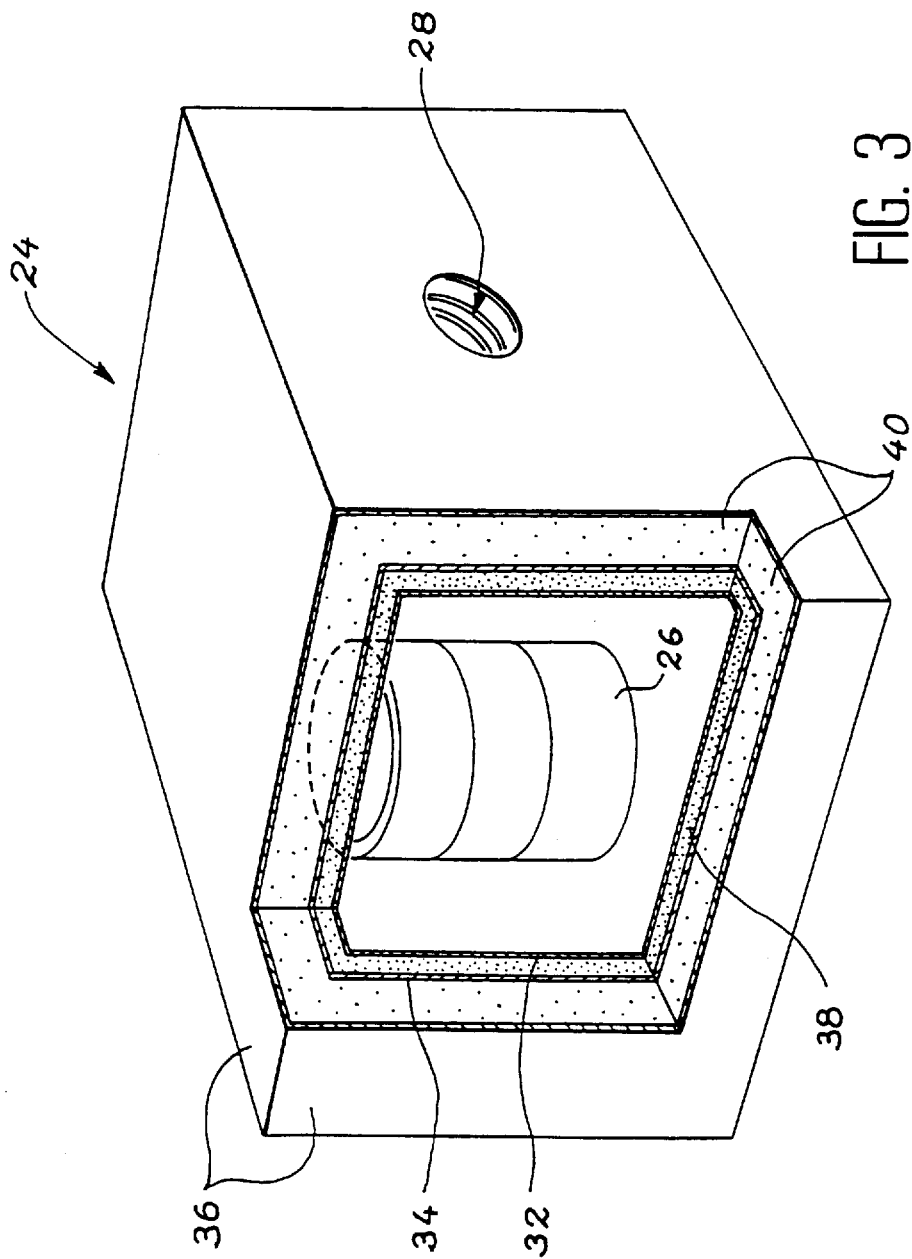

FIG. 3 is an exploded perspective view of an embodiment of the invention in which reference 24 designates the flash counting enclosure. The latter has a cubic wall, whose three faces are visible in FIG. 3. When using an active measurement method, one of the faces has a window 28 for the passage of a photon beam, e.g. a bremsstrahlung beam, which is then directed towards a waste container 26 introduced into the enclosure. Passive interrogation methods require no such window. Reference 32 designates an inner cadmium protection integrally covering the inner surface of the enclosure wall. Behind said inner cadmium protection are successively provided a moderator coating 38 e.g. of polyethylene, paraffin or water and an intermediate cadmium coating 34 covering the entire outer surface of the inner moderator 38. An outer moderator coating 40 follows the coating 34 and is also e.g. of polyethylene, paraffin or water. This outer moderator coating is enveloped in an outer cadmium protection 36.

Figure 1:
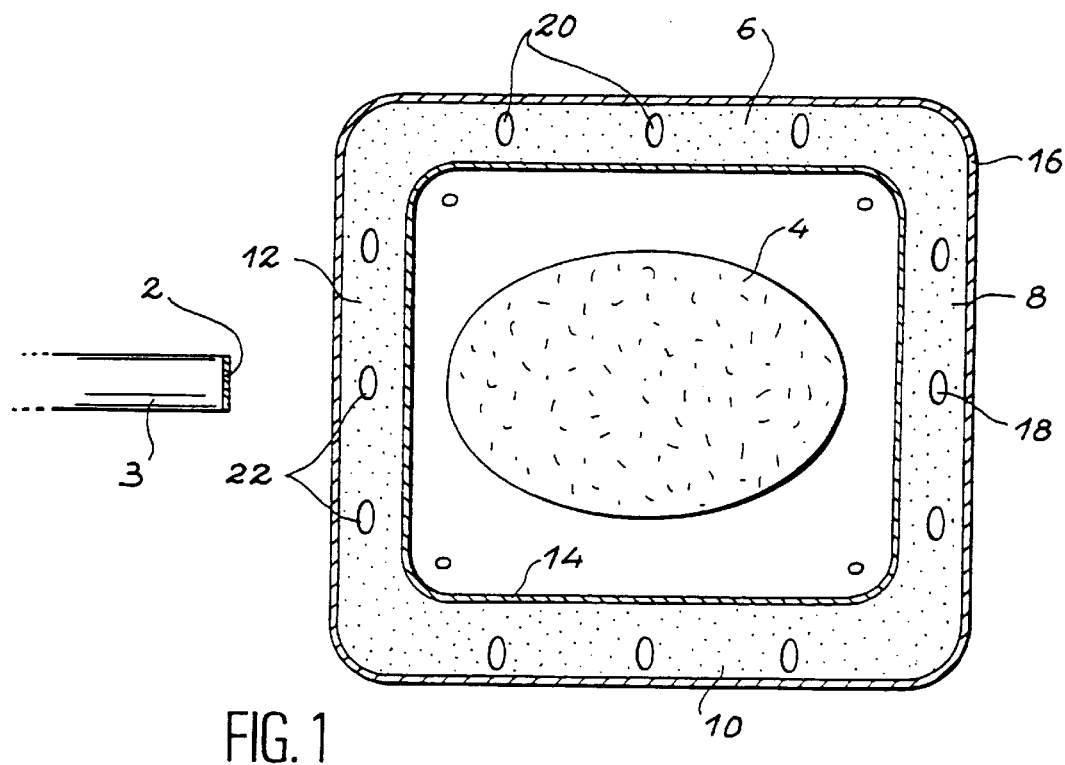
FIG. 1, already described, diagrammatically a flash-counting enclosure according to the prior art.
Figure 4:
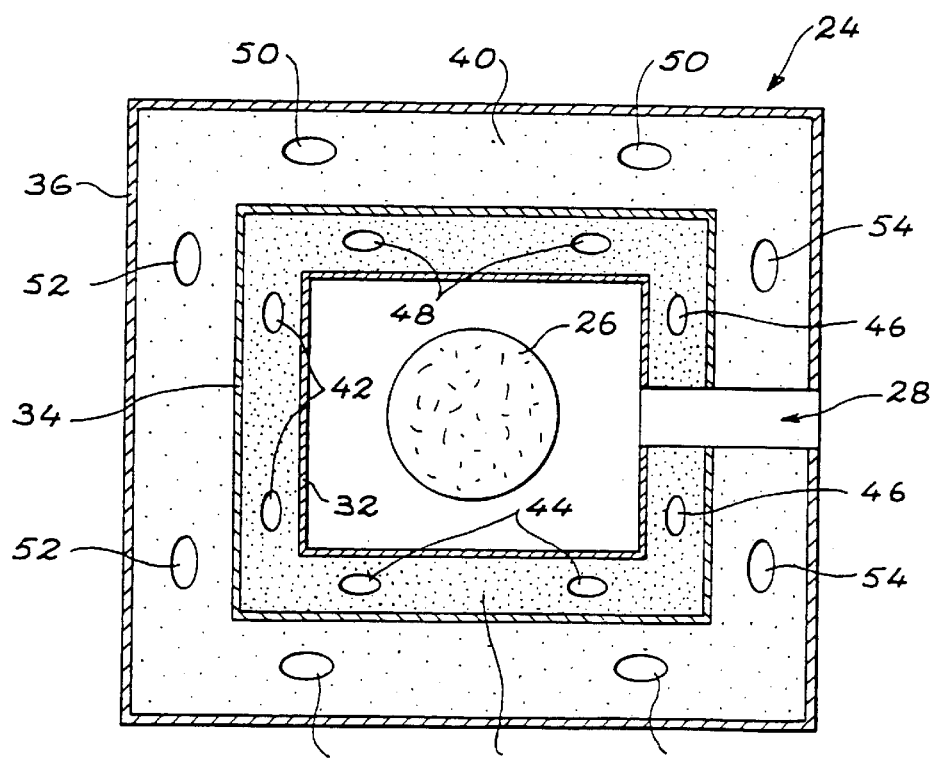
FIGS. 3 and 4 respectively an exploded view in perspective and a sectional view of a flash and counting enclosure according to the invention.
Figure 2:
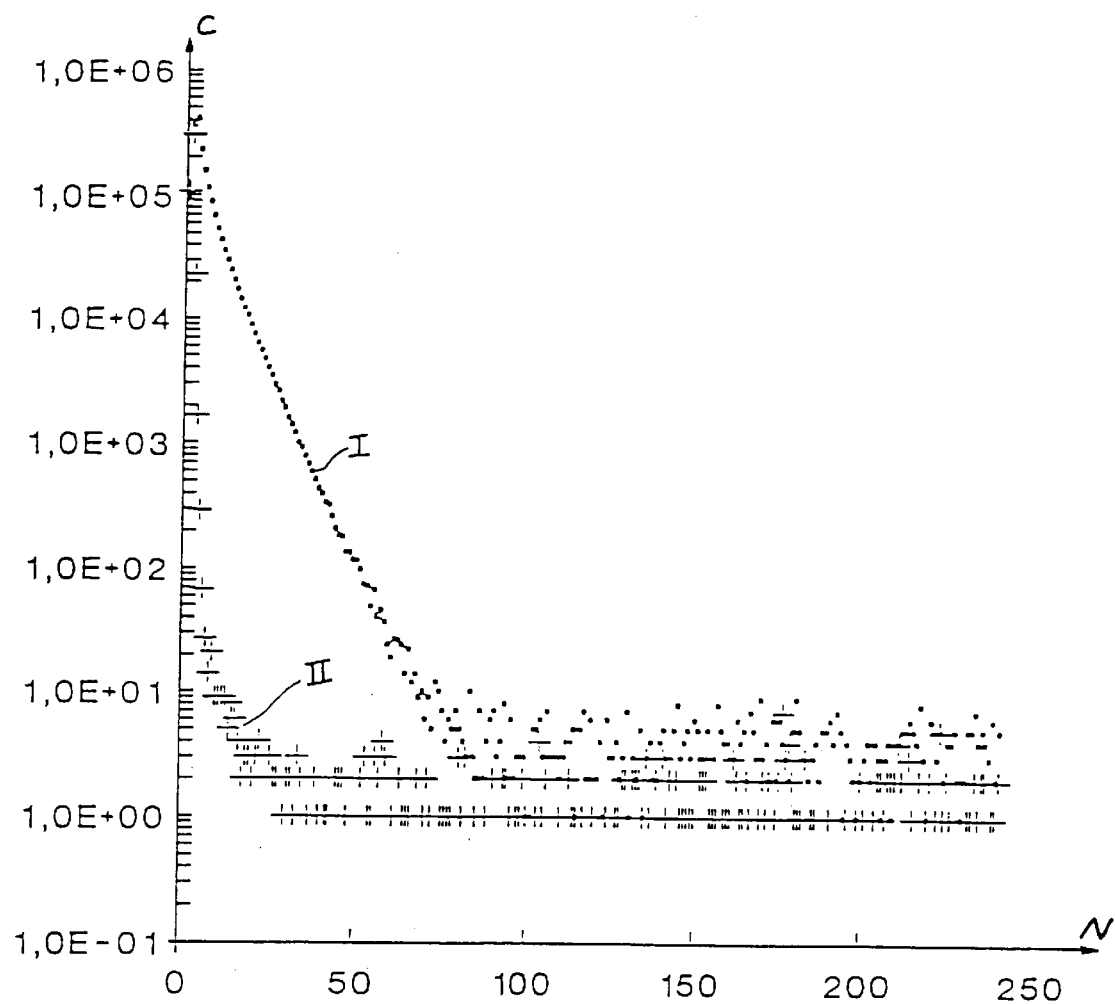
FIG. 2, already described, a recording, as a function of time, of neutrons (γ, n) by a counting unit, with and without cadmium.

As illustrated in FIG. 4, where identical references to those of FIG. 3 designate the same elements, He neutron detectors 42, 44, 46, 48 are placed in the moderator coating 38. These detectors permit the counting of the delayed photofission signal. They are generally optimized in known manner in order to have an optimum sensitivity at a given energy, e.g. 400 keV.

These detectors are connected to the power supplies necessary for their operation and to measurement and signal processing means located outside the counting enclosure and not shown in the drawings.

For an external photoneutron (i.e. any neutron coming from a γ, n reaction on materials constituting the experimental location) two situations can arise:

either it is epicadmic, i.e. with an energy above 0.417 eV, in which case the neutron is able to clear the outer cadmium barrier 36 and is then located in the outer moderator coating 40, where it will be slowed down in order to finally pass below the cadmium cut-off energy and will in this way be absorbed in the second cadmium envelope 34;

or it is not epicadmic, i.e. it has an energy below 0.417 eV, in which case the photoneutron does not pass beyond the outer cadmium envelope 36.

As regards to photoneutrons within the enclosure, i.e. those resulting from the interaction of photons with the waste coating matrix, if their energy allows, they are detected by the detectors 42, 44, 46, 48 for the counting of delayed photofission neutrons. This detection takes place at times such that there can be no interference with the useful delayed signal. In the opposite case, i.e. if the energy of these internal photoneutrons exceeds the mean energy of the delayed neutrons, they will be located in the outer moderator coating 40. As a result of the cadmium protection 34, these neutrons will have a very limited probability of backscattering towards the detectors 42 to 48. In view of the fact that the mean energy of the photoneutrons is approximately 3 MeV, the latter scenario is the most frequently encountered.

The final case in the drawing relates to internal and/or external, parasitic photoneutrons being located in the enclosure with an energy below the cadmium cut-off energy. These neutrons are absorbed by the inner cadmium coating 32.

As a result of this enclosure, the parasitic signal due to the instantaneous (γ, n) reaction neutrons will be reduced by the cadmium protections and the two moderator coatings and on the other the average life of this signal will decrease in view of the small dimensions of the enclosure compared with the dimensions of the accelerator hall. Monte Carlo neutron transport calculations give a half-life of approximately 100 $\mu$s for neutrons with a mean energy of 2 MeV evolving in a moderator unit. This life is dependent on the geometry and the moderator material, but the order of magnitude still applies.

Moreover, neutron counters 50, 52, 54, 56 can be placed in the external moderator enclosure 40. These counters can serve as monitors for the photoneutron background noise and permit an on-line measurement of the parasitic signal. Thus, a careful choice of the moderator thicknesses enables these detectors to collect a considerable proportion of the internal parasitic photoneutrons. A proportionality coefficient leads to knowledge of the background noise occurring in the useful delayed signal measuring unit. The thus measured parasitic signal can be subtracted from the useful signal during data processing. Measurements can also take place with a single series of detectors located in the inner moderator coating.

The outer moderator coating 40 stops the external photoneutrons having a certain energy spectrum. The inner coating 38 permits the passage of internal photoneutrons with an energy above the mean energy of the useful neutrons.

As a result of the orders of magnitude of the energies involved, the thickness of the inner moderator coating will be less than that of the outer coating. It is merely necessary to adapt the thickness of each coating to the energy ranges used, which can easily be done by the expert by carrying out successive tests. Thus, e.g. for external neutrons of energy 2 MeV, a thickness of the outer polyethylene coating 40 of approximately 15 cm is sufficient. If the energy varies around 2 MeV, it will be sufficient to vary the corresponding thickness in the same way. The cadmium coating will be approximately 0.5 to 2 mm thick.

Thus, the enclosure according to the invention is able to fulfil a triple function. The first consists of isolating the product to be illuminated (the radioactive waste and its coating matrix 26) from the external, parasitic photoneutron environment. The second function is to separate neutron signals of different energies. Finally, the third function is to reduce the life periods of the parasitic neutrons in order to prevent their interference with the useful delayed signal.

The invention makes it possible to detect and eliminate in the useful signal, the "late" component of high energy parasitic neutrons or rather the energy above the mean energy of the delayed neutrons. The invention has been described in conjunction with a cubic enclosure, but this enclosure can more generally have a random shape, e.g. parallelepipedic or spherical, the internal volume being adapted to the volume of the objects to be tested.

With the apparatus according to the invention, it is possible to significantly improve the signal-to-noise ratio. Thus, measurements performed with a 5 cm thick internal moderator 38, a 12.5 cm thick external moderator 40, approximately 1.5 mm thick cadmium coatings have led to the following S/B ratios:

uncoated waste: S/B≈190, polyethylene coated waste (equivalent to bitumen): S/B≈104, glass coated waste (vitrified waste or in concreted packs): S/B≈101.

Moreover, it is possible to optimize the thickness of moderating materials so as to obtain a ratio S/B exceeding 200.

In the preceding description, the neutron detectors are placed in the inner coating of the moderator. However, the invention also includes embodiments where the detectors are placed within the enclosure.

In a first case, use is made of bare detectors able to detect thermal neutrons. In a second case, said detectors are surrounded with a moderator coating, e.g. of polyethylene, as well as a cadmium coating and fast neutrons are detected.

Finally, it would not fall outside the scope of the invention if cadmium was replaced by another efficient thermal or epithermal neutron absorbing material.

The potential applications of the invention can be summarized as follows:

1) Combined neutron-photon interrogation.
2) Determination of the humidity level in plutonium powders.
3) Control of fissile and fertile elements in basic nuclear installations.
4) Detection of heavy matter (fissile or fertile) in stations, airports, ports, etc.
5) Detection of explosives.

These applications use active or passive interrogation methods in cases 2) and 3). In the case of active methods, in the measurement enclosure wall, it is necessary to provide a window for the passage of the exciting beam.

We claim:

1. Counting enclosure for the detection of neutrons, said enclosure having an outer wall and an inner space for receiving an object to be tested, the wall being constituted in sequence by a first, inner cadmium coating, an inner moderator coating, an intermediate cadmium coating, an outer moderator coating and an outer cadmium coating.

2. Enclosure according to claim 1, also having a window in the wall for the passage of an exciting radiation beam.

3. Enclosure according to claim 1, also comprising one or more neutron detectors placed in the inner moderator coating.

4. Enclosure according to claim 1, also comprising one or more neutron detectors placed in the outer moderator coating.

5. Enclosure according to claim 3, wherein the one or more neutron detectors are of the helium-3($^3$He) type.

6. Enclosure according to claim 2, also comprising one or more neutron detectors placed in the inner moderator coating.

7. Enclosure according to claim 2, also comprising one or more neutron detectors placed in the outer moderator coating.

8. Enclosure according to claim 4, wherein the one or more neutron detectors are of the helium-3($^3$He) type.

* * * * *

UNITED STATES PATENT AND TRADEMARK OFFICE
CERTIFICATE OF CORRECTION

PATENT NO. : 5,828,069
DATED : October 27, 1998
INVENTOR(S) : Umiastowski et al

It is certified that error appears in the above-identified patent and that said Letters Patent is hereby corrected as shown below:

Claim 8, Col. 6, line 19, "helium-3($^3$ He)" should be --helium-3($^3$He)--

Signed and Sealed this

Seventeenth Day of August, 1999

Attest:

Q. TODD DICKINSON

*Attesting Officer*     *Acting Commissioner of Patents and Trademarks*